United States Patent
Haas et al.

(10) Patent No.: US 10,124,749 B2
(45) Date of Patent: Nov. 13, 2018

(54) ELECTRICAL CABLE AND CONNECTOR WITH INTERNAL TEMPERATURE-SENSING MECHANISM

(71) Applicant: MD ELEKTRONIK GmbH, Waldkraiburg (DE)

(72) Inventors: Alexander Haas, Muehldorf (DE); Sebastian Mirz, Kraiburg (DE); Josef Ohni, Kraiburg (DE); Roland Preis, Aschau (DE); Simon Geltinger, Adlkofen (DE)

(73) Assignee: MD ELEKTRONIK GmbH, Waldkraiburg (DE)

( * ) Notice: Subject to any disclaimer, the term of this patent is extended or adjusted under 35 U.S.C. 154(b) by 0 days.

(21) Appl. No.: 15/721,981

(22) Filed: Oct. 2, 2017

(65) Prior Publication Data
US 2018/0105124 A1 Apr. 19, 2018

(30) Foreign Application Priority Data
Oct. 17, 2016 (EP) ..................................... 16194144

(51) Int. Cl.
*H01R 13/504* (2006.01)
*B60R 16/02* (2006.01)
*H01R 13/66* (2006.01)
*B29C 45/56* (2006.01)
*H01R 13/52* (2006.01)
*H01R 43/24* (2006.01)
(Continued)

(52) U.S. Cl.
CPC ........ *B60R 16/0215* (2013.01); *B29C 45/561* (2013.01); *H01R 13/504* (2013.01); *H01R 13/5205* (2013.01); *H01R 13/6616* (2013.01); *H01R 13/6683* (2013.01); *H01R 43/24* (2013.01); *F16D 2066/001* (2013.01); *H01R 13/533* (2013.01); *H01R 2201/26* (2013.01)

(58) Field of Classification Search
CPC .... H01R 13/24; H01R 13/405; H01R 13/504; H01R 13/58; H01R 13/561; H01R 13/523; H01R 13/5845; B29C 45/561
USPC .................................................. 439/606, 913
See application file for complete search history.

(56) References Cited

U.S. PATENT DOCUMENTS 4,549,105 A * 10/1985 Yamamoto ......... B22D 11/0401
310/87
5,776,564 A 7/1998 Kontants
(Continued)

FOREIGN PATENT DOCUMENTS
DE 4423677 A1 1/1995

*Primary Examiner* — Tulsidas C Patel
*Assistant Examiner* — Peter G Leigh
(74) *Attorney, Agent, or Firm* — Leydig, Voit & Mayer, Ltd.

(57) ABSTRACT

A cable includes a lead having at least one wire, and a connector having at least one contact and a liquid-tight dielectric housing. The at least one contact is electrically connected to the at least one wire such that an electric current is conductible from the at least one wire into the at least one contact. A temperature-sensitive measuring resistor is contained in the housing and is electrically connected to the at least one wire such that at least a portion of the electrical current that is conductible into the at least one contact flows through the measuring resistor. A metallic element is disposed on the housing and thermally connected to the measuring resistor.

20 Claims, 2 Drawing Sheets

(51) Int. Cl.
H01R 13/533 (2006.01)
F16D 66/00 (2006.01)

(56) References Cited

U.S. PATENT DOCUMENTS

| | | | | |
|---|---|---|---|---|
| 6,482,036 | B1* | 11/2002 | Broussard | H01R 13/523 |
| | | | | 439/606 |
| 6,802,741 | B1* | 10/2004 | Shatkin | H01R 13/7137 |
| | | | | 200/51 R |
| 8,449,328 | B2* | 5/2013 | Ooki | C08L 53/025 |
| | | | | 439/271 |
| 8,480,422 | B2* | 7/2013 | Siahaan | H01R 13/504 |
| | | | | 439/278 |
| 8,734,178 | B2* | 5/2014 | Inagaki | H01R 13/5808 |
| | | | | 439/369 |
| 8,736,226 | B2* | 5/2014 | Mukai | B60L 3/0069 |
| | | | | 320/104 |
| 9,257,784 | B2* | 2/2016 | Kawamoto | H01R 13/424 |
| 2010/0019733 | A1 | 1/2010 | Rubio | |
| 2011/0312219 | A1* | 12/2011 | Siahaan | H01R 13/504 |
| | | | | 439/625 |
| 2014/0364014 | A1* | 12/2014 | Kawamoto | H01R 13/424 |
| | | | | 439/692 |
| 2015/0171567 | A1* | 6/2015 | Kawamoto | H01R 13/665 |
| | | | | 439/620.21 |
| 2016/0104978 | A1* | 4/2016 | Chaumeny | H01R 13/6683 |
| | | | | 439/620.22 |

* cited by examiner

ELECTRICAL CABLE AND CONNECTOR WITH INTERNAL TEMPERATURE-SENSING MECHANISM

CROSS-REFERENCE TO PRIOR APPLICATION

Priority is claimed to European Patent Application No. EP 16194144.8, filed on Oct. 17, 2016, the entire disclosure of which is hereby incorporated by reference herein.

FIELD

The present invention relates to a cable assembly including, in particular, a connector or coupling element.

Such cables can be used, for instance, in motor vehicles, for example in brake systems of motor vehicles, and are mostly required in large quantities. Simple construction and simple preassembly are important factors in the economic supply of corresponding cables. Such cables must be manufactured with high process reliability and such that they meet high standards with regard to robustness, in particular in terms of imperviousness to water or other liquids.

BACKGROUND

German Laid Open Application DE 44 23 677 A1 describes a multi-pole connector which is suitable for installation in a brake system on motor vehicles. That document describes, inter alia, that it is advantageous to produce the respective connector using an injection-molding process in order to create a liquid-tight housing. This is to ensure the suitability of the connector for use in the harsh environment of a brake system.

SUMMARY

In an embodiment, the present invention provides a cable including a lead having at least one wire, and a connector having at least one contact and a liquid-tight dielectric housing. The at least one contact is electrically connected to the at least one wire such that an electric current is conductible from the at least one wire into the at least one contact. A temperature-sensitive measuring resistor is contained in the housing and is electrically connected to the at least one wire such that at least a portion of the electrical current that is conductible into the at least one contact flows through the measuring resistor. A metallic element is disposed on the housing and thermally connected to the measuring resistor.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
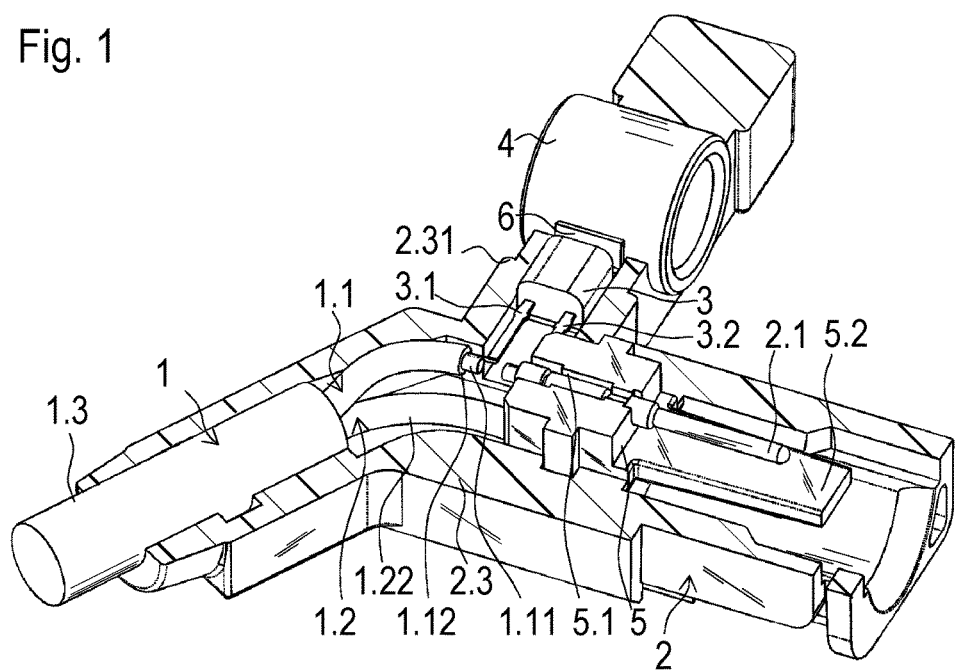
FIG. 1 is a first perspective sectional view of a cable.
Figure 2:
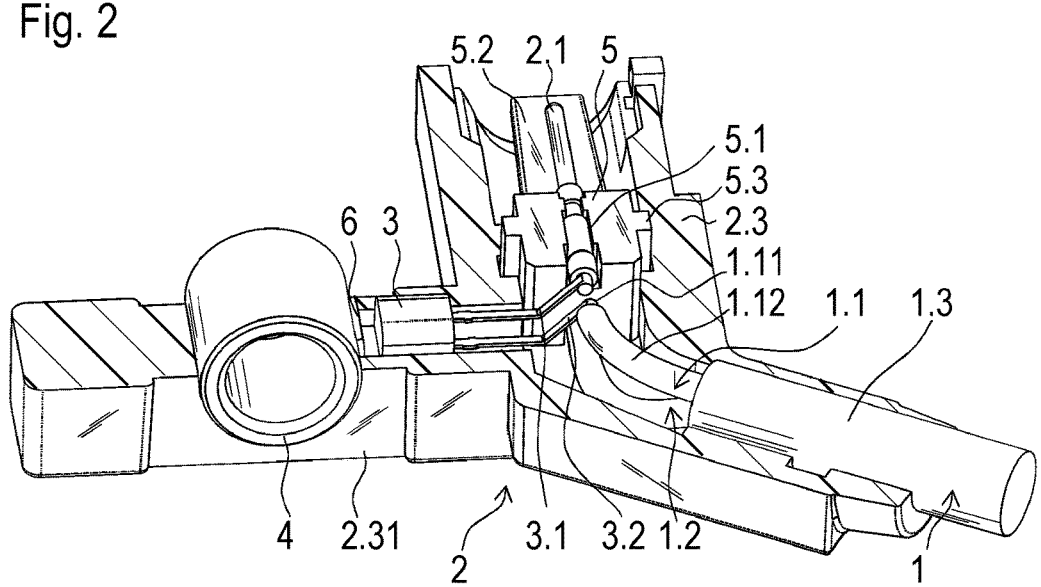
FIG. 2 is a second perspective sectional view of the cable.
Figure 3:
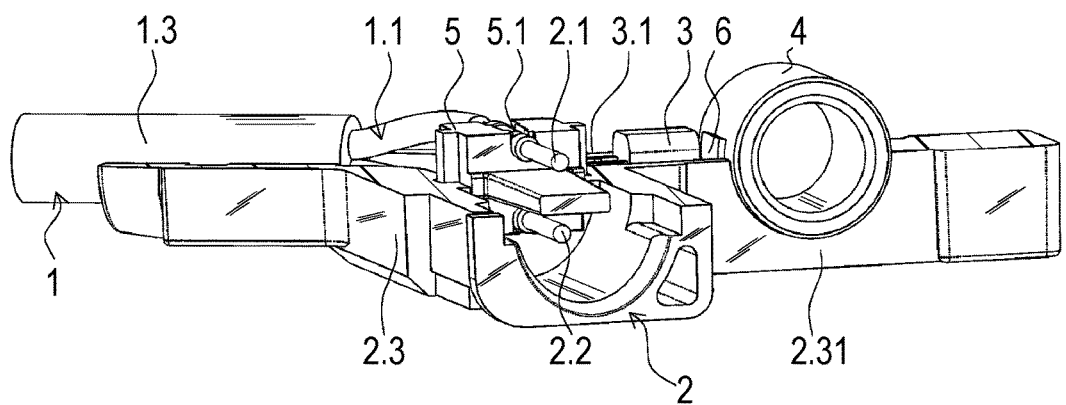
FIG. 3 is a third perspective sectional view of the cable.

In an embodiment, the present invention provides an optimized cable that is suitable, in particular, for use in harsh environments such as in connection with brake systems.

In accordance with an embodiment of the present invention, the cable includes a lead which has at least one wire, and often a jacket. The cable further includes a connector having at least one contact and a liquid-tight dielectric housing. The at least one contact, which can be brought into contact with a counterpart in the manner of an electrical coupling in accordance with the intended purpose thereof, is electrically connected to the at least one wire, so that an electric current can be conducted from the at least one wire into the contact. Furthermore, the housing contains a temperature-sensitive measuring resistor which is electrically connected to the at least one wire in such a way that at least a portion of the electrical current that is conductible through the at least one contact flows through the measuring resistor. In addition, a metallic element which is thermally connected to the measuring resistor is disposed on the housing.

The contact is an electrically conductive end piece of the wire; i.e., an end piece of the conductor, and may take the form of a pin or a socket.

In an advantageous construction, the cable is configured such that the housing includes a projection on which the metallic element is disposed and within which the measuring resistor is disposed.

In a further embodiment of the present invention, the metallic element extends through the housing, so that, in particular, a partial surface of the metallic element points into the interior of the housing and another partial surface of the metallic element is located outside of the housing. In particular, the metallic element extends through the projection of the housing.

The metallic element is advantageously configured to be suitable for attaching the connector to another component. In an advantageous construction, the metallic element is configured as a sleeve or grommet and, in particular, has an opening or bore extending therethrough and surrounded by the material of the element. The element may, for example, have a hollow cylindrical geometry or the shape of a segment of a hollow cylindrical geometry. Thus, in particular, the metallic element is surrounded by the housing in such a way that the through-opening or bore is accessible from both sides of the opening or bore.

Advantageously, the metallic element is thermally connected to the measuring resistor via a sheet-metal part. The sheet-metal part may, in particular, be disposed and resiliently preloaded between the metallic element and the measuring resistor in the housing. Alternatively or in addition to the sheet-metal part, a thermal connection may be obtained by a heat-conducting paste or a thermally conductive adhesive. The thermal connection may also be created in a simple manner by direct touching contact between the measuring resistor and the metallic element.

In a further embodiment of the present invention, the measuring resistor is electrically connected to the at least one wire in such a way that the electrical current that is conductible through the at least one contact flows entirely through the measuring resistor. In other words, in this arrangement, the measuring resistor is connected in series with the conductor and the contact. In particular, the measuring resistor is connected between the conductor and the contact. Advantageously, the at least one wire is severed or cut apart or interrupted, so that the at least one wire has two ends. Then, the measuring resistor is electrically contacted to the respective ends of the at least one wire. Thus, the measuring resistor bridges the point of severance of the at least one wire. In particular, in this arrangement, a portion of the conductor may be removed, the removed portion being by bridged by the measuring resistor.

Advantageously, the housing is manufactured using an overmolding process, so that the measuring resistor is overmolded. Moreover, in this construction, the wire is at least partially surrounded by the overmold. The term "partially" refers in particular to the length of the wire, so that the wire is completely surrounded by the overmold at least over a portion of its length.

In an advantageous construction, the cable has a contact holder to which the at least one contact is secured and which is surrounded by the housing. If the housing is manufactured using an overmolding process, the contact holder, in particular, may also be overmolded. Alternatively or additionally, the metallic element may be overmolded. Furthermore, alternatively or additionally, the lead may have an insulating jacket, which is removed at the end of the lead and which may be overmolded over a portion of its length. In particular, the wires may be surrounded by the overmold (in particular, completely) over a length along which the jacket is removed; i.e., in the portion of the lead from which the jacket has been removed.

In a further embodiment of the present invention, the contact is connected to the wire by crimping.

The figures illustrate a cable for transmitting a signal, for example for monitoring brake wear, which is intended, in particular, for installation in a vehicle. Such cables are exposed to particularly harsh environments because they are mounted outside of the vehicle body near the axles of the vehicle.

The cable includes a lead 1 and a connector 2 or coupling element. At one end, the cable can be detachably connected by connector 2 to a counterpart of another component, such as, for example, a socket provided, for example, on a brake caliper, in the manner of a plug-type connection. The other end of the cable may also be provided with a coupling element. In the exemplary embodiment presented here, lead 1 includes a first wire 1.1 and a second wire 1.2. Wires 1.1, 1.2 each include a conductor 1.11 (the conductor of second wire 1.2 is not visible in the figures), the conductors being surrounded by an insulating layer 1.12, 1.22. Conductors 1.11 may, for example, each include a plurality of strands. Accordingly, in the exemplary embodiment presented here, wires 1.1, 1.2 may also be referred to as stranded wires. Lead 1 further includes an insulating jacket 1.3 enclosing the wires 1.1, 1.2.

During manufacture of the cable, first, jacket 1.3 is slit along a circumferential line at the end of lead 1, and is subsequently pulled off or removed. Thereafter, insulating layers 1.12, 1.22 are stripped from the ends of wires 1.1, 1.2, so that conductors 1.11 are exposed.

Then, contacts 2.1, 2.2 are attached to the lead 1 prepared in this manner. In particular, each of the contacts 2.1, 2.2 is fixed to a respective one of the stripped ends of wires 1.1; i.e., to a respective one of conductors 1.11, here by a crimping process, or else by a soldering or welding process.

In the exemplary embodiment presented here, the cable further includes a contact holder 5 which made of a dielectric or electrically insulating material and, in this case, is manufactured as an injection-molded part. Contact holder 5 includes two pass-through openings 5.1 Pass-through openings 5.1 are oriented parallel to each other. To enable contact holder 5 to be firmly enclosed by the overmold to be applied later, ribs 5.3 are formed on contact holder 5. Contact holder 5 further includes a so-called isolating blade 5.2.

At a later point in the manufacture of the cable, contacts 2.1, 2.2 are inserted into contact holder 5; i.e., into the pass-through openings 5.1 thereof, so that contacts 2.1, 2.2 are disposed parallel to each other in contact holder 5. Pass-through openings 5.1 are configured to allow contacts 2.1, 2.2 to be inserted radially (with respect to the longitudinal axis of contacts 2.1, 2.2) and to be somewhat undersized in relation to the outside diameter of contacts 2.1, 2.2, so that upon insertion into contact holder 5, contacts 2.1, 2.2 are secured in place in contact holder 5.

Then, first wire 1.1 is severed in the region near contact holder 5 where the jacket has been removed, so that first wire 1.1 has two ends in this region. In particular, in the region near contact holder 5 where the jacket has been removed, a short portion of conductor 1.11 is cut out of first wire 1.1 together with insulating layer 1.12. Thereafter, the severed ends of first wire 1.1 are freed of insulating layer 1.12 over a short length, so that conductor 1.11 is exposed at the respective ends.

Subsequently, a temperature-sensitive measuring resistor 3, which, in the exemplary embodiment presented here, is a Pt-100 element, is connected to first wire 1.1. To this end, a connecting element 3.1 of measuring resistor 3 is electrically contacted to one end of conductor 1.11 of first wire 1.1, and another connecting element 3.2 of measuring resistor 3 is electrically contacted to the contact-side end of conductor 1.11 of first wire 1.1. In the exemplary embodiment presented here, contacting is done using a soldering process. Thus, in this exemplary embodiment, measuring resistor 3 is disposed in series with conductor 1.11 and contact 2.1 from an electrical point of view. Consequently, during operation of the cable, all of the current conducted through wire 1.1; i.e., through its conductor 1.11, is forced to flow through measuring resistor 3.

Contact holder 5, together with the lead 1 secured thereto and measuring resistor 3, is placed in an overmolding machine. In addition, a metallic element 4, which, in the exemplary embodiment presented here, is in the form of a hollow cylindrical sleeve, as well as a sheet-metal part 6 are also placed in the overmolding machine with positional accuracy. This done in such a way that sheet-metal part 6 is mechanically preloaded under resilient deformation against both measuring resistor 3 and metallic element 4.

Then, lead 1, contact holder 5, measuring resistor 3, sheet-metal part 6, and metallic element 4 are overmolded with dielectric material (e.g., with thermoplastic material, thermosetting plastic or with an elastomer), so that at least the measuring resistor 3 and the ends of first wire 1.1 that are contacted thereto are surrounded by the overmold, which forms a liquid-tight housing 2.3.

Metallic element 4 is partially surrounded by liquid-tight housing 2.3. Housing 2.3 has a projection 2.31 on which metallic element 4 is disposed. Measuring resistor 3 is disposed within projection 2.31.

Metallic element 4, which, in this case, is configured as a sleeve or grommet, serves to receive a screw which may be threaded into a thread in a brake caliper of a motor vehicle, so that the cable and, in particular, connector 2 can be reliably secured thereto. Consequently, metallic element 4 serves as a fastening element.

Because metallic element 4 is connected to the brake caliper, it assumes, in a first approximation, the temperature of the brake caliper, which can be sensed by the hermetically sealed measuring resistor 3. Due to the special design of the cable, the cable can be hermetically sealed at its end; i.e., in the region of connector 2, in a comparatively simple manner. On the other hand, it is nevertheless possible to measure a quantity indicative of a relevant temperature outside of connector 2.

During operation of the motor vehicle, first wire 1.1 is connected to an electrical unit of the motor vehicle. Second wire 1.2 may be brought into contact with, for example, the ground potential of the motor vehicle. The electrical unit may be configured to deliver a constant output current, which flows through the cable. Often, a conductor loop is provided in the brake caliper; i.e., in the brake pad. As the brake pad wears, first, the conductor loop is injured, which may be suitably detected and result in a warning with respect to the wear of the brake pad. During further operation of the brake system, progressive wear results in complete interruption of the conductor loop, and thus of the measurement current. As a result, a corresponding alert is triggered.

Besides, measuring resistor 3 can be used to determine the temperature of the brake caliper, the signal of the temperature measurement being distinguishable from the changes in the conductor loop. Due to the design of the cable, the entire current flows through first wire 1.1, measuring resistor 3 and contact 2.1 during normal operation. No additional measurement lead is needed. Rather, conductor 1.11, which is required for the conductor loop measurement anyway, is also used for the temperature measurement.

When the brake pads need to be replaced, the connector must be detached from the brake caliper and subsequently connected to the conductor loop of the new brake pad. By incorporating the measuring resistor into the cable, there is no need to replace the temperature sensor in this assembly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A cable comprising:
   a lead having at least one wire;
   a connector having at least one contact and a liquid-tight dielectric housing, the at least one contact being electrically connected to the at least one wire such that an electric current is conductible from the at least one wire into the at least one contact;
   a temperature-sensitive measuring resistor which is contained in the housing and is electrically connected to the at least one wire such that at least a portion of the electrical current that is conductible into the at least one contact flows through the measuring resistor; and
   a metallic element disposed on the housing and thermally connected to the measuring resistor, wherein the metallic element extends through the housing.

2. The cable as recited in claim 1, wherein the housing includes a projection on which the metallic element is disposed and within which the measuring resistor is disposed.

3. The cable as recited in claim 1, wherein the metallic element is configured to attach the connector to another component.

4. The cable as recited in claim 3, wherein the metallic element is configured as a sleeve or grommet.

5. The cable as recited in claim 1, wherein the metallic element is thermally connected to the measuring resistor via a sheet-metal part.

6. The cable as recited in claim 5, wherein the sheet-metal part is disposed and resiliently preloaded between the metallic element and the measuring resistor.

7. The cable as recited in claim 5, wherein the sheet-metal part is disposed in the housing.

8. The cable as recited in claim 1, wherein the measuring resistor is electrically connected to the at least one wire such that the electrical current that is conductible into the at least one contact flows entirely through the measuring resistor.

9. The cable as recited in claim 8, wherein the at least one wire is severed such that the at least one wire has two ends, and wherein the measuring resistor is electrically contacted to the respective two ends of the at least one wire.

10. The cable as recited in claim 1, wherein the housing is manufactured using an overmolding process such that the measuring resistor is overmolded.

11. The cable as recited in claim 1, wherein the cable has a contact holder to which the at least one contact is secured and which is surrounded by the housing.

12. The cable as recited in claim 10, wherein the housing is manufactured using an overmolding process such that the contact holder is overmolded.

13. The cable as recited in claim 1, wherein the housing is manufactured using an overmolding process, and wherein the metallic element is overmolded.

14. The cable as recited in claim 1, wherein the housing is manufactured using an overmolding process, and wherein the lead has a jacket that is overmolded over a portion of a length of the jacket.

15. A cable comprising:
    a lead having at least one wire;
    a connector having at least one contact and a liquid-tight dielectric housing, the at least one contact being electrically connected to the at least one wire such that an electric current is conductible from the at least one wire into the at least one contact;
    a temperature-sensitive measuring resistor which is contained in the housing and is electrically connected to the at least one wire such that at least a portion of the electrical current that is conductible into the at least one contact flows through the measuring resistor; and
    a metallic element disposed on the housing and thermally connected to the measuring resistor, wherein the metallic element is configured to attach the connector to another component.

16. The cable as recited in claim 15, wherein the metallic element is configured as a sleeve or grommet.

17. A cable comprising:
    a lead having at least one wire;

a connector having at least one contact and a liquid-tight dielectric housing, the at least one contact being electrically connected to the at least one wire such that an electric current is conductible from the at least one wire into the at least one contact;

a temperature-sensitive measuring resistor which is contained in the housing and is electrically connected to the at least one wire such that at least a portion of the electrical current that is conductible into the at least one contact flows through the measuring resistor; and a metallic element disposed on the housing and thermally connected to the measuring resistor, wherein the metallic element is thermally connected to the measuring resistor via a sheet-metal part.

18. The cable as recited in claim 17, wherein the sheet-metal part is disposed in the housing and resiliently preloaded between the metallic element and the measuring resistor.

19. A cable comprising:
a lead having at least one wire;
a connector having at least one contact and a liquid-tight dielectric housing, the at least one contact being electrically connected to the at least one wire such that an electric current is conductible from the at least one wire into the at least one contact;

a temperature-sensitive measuring resistor which is contained in the housing and is electrically connected to the at least one wire such that at least a portion of the electrical current that is conductible into the at least one contact flows through the measuring resistor; and a metallic element disposed on the housing and thermally connected to the measuring resistor, wherein the measuring resistor is electrically connected to the at least one wire such that the electrical current that is conductible into the at least one contact flows entirely through the measuring resistor.

20. The cable as recited in claim 19, wherein the at least one wire is severed such that the at least one wire has two ends, and wherein the measuring resistor is electrically contacted to the respective two ends of the at least one wire.

* * * * *